United States Patent
Gupta et al.

(10) Patent No.: US 11,003,777 B2
(45) Date of Patent: *May 11, 2021

(54) DETERMINING A FREQUENCY AT WHICH TO EXECUTE TRAP CODE IN AN EXECUTION PATH OF A PROCESS EXECUTING A PROGRAM TO GENERATE A TRAP ADDRESS RANGE TO DETECT POTENTIAL MALICIOUS CODE

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Trung N. Nguyen, Vail, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 15/954,341

(22) Filed: Apr. 16, 2018

(65) Prior Publication Data
US 2019/0318091 A1    Oct. 17, 2019

(51) Int. Cl.
*G06F 21/56* (2013.01)

(52) U.S. Cl.
CPC .......... *G06F 21/566* (2013.01); *G06F 21/567* (2013.01); *G06F 2221/033* (2013.01)

(58) Field of Classification Search
CPC ...... G06F 21/544; G06F 21/54; G06F 21/566; G06F 21/567; G06F 21/568;
(Continued)

(56) References Cited

U.S. PATENT DOCUMENTS 5,956,751 A    9/1999  Lai
7,302,619 B1  11/2007  Tompkins et al.
(Continued)

FOREIGN PATENT DOCUMENTS

CN    101944041 A    1/2011
CN    102667794 A    9/2012
(Continued)

OTHER PUBLICATIONS

Machine Translation for CN101944041A, published Jan. 12, 2011, Total 12 pages.
(Continued)

*Primary Examiner* — Alexander Lagor
*Assistant Examiner* — William B Jones
(74) *Attorney, Agent, or Firm* — Konrad, Raynes, Davda and Victor LLP; David W. Victor

(57) ABSTRACT

Provided are a computer program product, system, and method for determining a frequency at which to execute trap code in an execution path of a process executing a program to generate a trap address range to detect potential malicious code. Trap code is executed in response to processing a specified type of command in application code to allocate a trap address range used to detect potentially malicious code. A determination is whether to modify a frequency of executing the trap code in response to processing a specified type of command. The frequency of executing the trap code is modified in response to processing the specified type of command in response to determining to determining to modify the frequency of executing the trap code.

25 Claims, 9 Drawing Sheets

(58) Field of Classification Search
CPC ............. G06F 2221/033; G06F 3/0634; G06F 3/0673; G06F 3/0622
See application file for complete search history.

(56) References Cited

U.S. PATENT DOCUMENTS

| | | | |
|---|---|---|---|
| 7,971,255 | B1 | 6/2011 | Kc et al. |
| 8,515,075 | B1 | 8/2013 | Saraf et al. |
| 9,038,176 | B2 | 5/2015 | Sallam |
| 9,407,648 | B1 | 8/2016 | Pavlyushchik et al. |
| 9,471,514 | B1 | 10/2016 | Badishi et al. |
| 9,594,629 | B2 | 3/2017 | AlJuffri et al. |
| 9,690,502 | B2 | 6/2017 | Pawlowski |
| 9,734,334 | B2 | 8/2017 | Goel et al. |
| 10,157,277 | B2 | 12/2018 | LeMay et al. |
| 10,467,407 | B2 | 11/2019 | Frank et al. |
| 2008/0216175 | A1 | 9/2008 | Pike |
| 2012/0254995 | A1* | 10/2012 | Sallam ................ G06F 21/566 726/22 |
| 2012/0255004 | A1 | 10/2012 | Sallam |
| 2012/0255012 | A1 | 10/2012 | Sallam |
| 2013/0024939 | A1* | 1/2013 | Glew ................ G06F 21/577 726/24 |
| 2013/0276056 | A1 | 10/2013 | Epstein |
| 2014/0181976 | A1 | 6/2014 | Snow et al. |
| 2015/0199514 | A1 | 7/2015 | Tosa et al. |
| 2015/0248557 | A1 | 9/2015 | Sallam |
| 2015/0339480 | A1 | 11/2015 | Lutas et al. |
| 2016/0048679 | A1 | 2/2016 | Lutas et al. |
| 2016/0048680 | A1 | 2/2016 | Lutas et al. |
| 2016/0070912 | A1 | 3/2016 | Goel et al. |
| 2016/0072830 | A1 | 3/2016 | Goel et al. |
| 2016/0085992 | A1 | 3/2016 | Boivie et al. |
| 2016/0139989 | A1 | 5/2016 | Muralimanohar et al. |
| 2016/0180079 | A1 | 6/2016 | Sahita et al. |
| 2017/0004309 | A1 | 1/2017 | Pavlyushchik et al. |
| 2017/0116419 | A1 | 4/2017 | Woodward et al. |
| 2018/0004946 | A1 | 1/2018 | LeMay et al. |
| 2018/0075236 | A1* | 3/2018 | Kwon ................ G06F 21/554 |
| 2018/0096136 | A1 | 4/2018 | LeMay et al. |
| 2018/0247069 | A1 | 8/2018 | Tang |
| 2018/0285561 | A1 | 10/2018 | Frank et al. |
| 2019/0005231 | A1 | 1/2019 | Peleg |
| 2019/0034633 | A1 | 1/2019 | Seetharamaiah et al. |
| 2019/0121571 | A1* | 4/2019 | Wahla ................ G06F 21/552 |
| 2019/0121964 | A1 | 4/2019 | LeMay et al. |
| 2019/0243776 | A1 | 8/2019 | Amit et al. |
| 2019/0243965 | A1 | 8/2019 | Wei et al. |
| 2019/0243966 | A1 | 8/2019 | Wei et al. |
| 2020/0012787 | A1 | 1/2020 | Frank et al. |

FOREIGN PATENT DOCUMENTS

| | | |
|---|---|---|
| CN | 107818245 A | 3/2018 |
| WO | 2012040045 | 3/2012 |

OTHER PUBLICATIONS

Machine Translation for CN102667794A, published Sep. 12, 2012, Total 13 pages.
Machine Translation for CN107818245A, published Mar. 20, 2018, Total 18 pages.
International Search Report and Written Opinion, for P20180440PCT1, dated Jul. 3, 2019, Total 9 pages.
20180075236 is the English publication for CN107818245A.
"How the Meltdown and Spectre bugs work and what you can do to prevent a performance plummet", Ellexus, https://www.ellexus.com/wp-content/uploads/2018/01/180107-Meltdown-and-Spectre-white-paper, pp. 5.
"Code Injection", Wikipedia, [online][retrieved Feb. 21, 2018] https://en.wikipedia.org/wiki/Code_injection, pp. 5.
"Command Injection", OWASP, [online][retrieved Feb. 21, 2018] https://www.owasp.org/index.php/Command_Injection, pp. 3.
US Application, dated Apr. 16, 2018, for U.S. Appl. No. 15/954,334 (18.781) filed Apr. 16, 2018, invented by Lokesh M. Gupta et al., Total 32 pages.
List of IBM Patents or Patent Applications Treated as Related, dated Apr. 16, 2018, Total 2 pages.
Office Action, dated Feb. 6, 2020, for U.S. Appl. No. 15/954,334 (18.781) filed Apr. 16, 2018, invented by Lokesh M. Gupta et al., Total 22 pages.
Corrected Notice of Allowability, dated Jul. 23, 2020, for U.S. Appl. No. 15/954,334 (18.781) filed Apr. 16, 2018, invented by Lokesh M. Gupta et al.,Total 11 pages.
Response to Office Action, dated May 6, 2020 for U.S. Appl. No. 15/954,334 (18.781) filed Apr. 16, 2018, invented by Lokesh M. Gupta et al.,Total 11 pages.
Notice of Allowance, dated Jun. 5, 2020, for U.S. Appl. No. 15/954,334 (18.781) filed Apr. 16, 2018, invented by Lokesh M. Gupta at al.,Total 10 pages.

* cited by examiner

Trap Code Frequency Information

Speculative Execution Information

DETERMINING A FREQUENCY AT WHICH TO EXECUTE TRAP CODE IN AN EXECUTION PATH OF A PROCESS EXECUTING A PROGRAM TO GENERATE A TRAP ADDRESS RANGE TO DETECT POTENTIAL MALICIOUS CODE

BACKGROUND OF THE INVENTION

1. Field of the Invention

The present invention relates to a computer program product, system, and method for determining a frequency at which to execute trap code in an execution path of a process executing a program to generate a trap address range to detect potential malicious code.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software. One type of malicious software known as ransomware encrypts user data, and then the operator of the ransomware blackmails the victim of the attack requiring payment for the encryption key to use to decrypt their data.

Malicious code may try to access data in protected memory by reading memory data from protected memory stored in a system cache as part of caching operations. Protected memory comprises a region of the system memory that processes should not be able to access unless the process has permission to access. Legitimate processes may store certain protected data not intended for other applications in the protected memory, such as personal information, passwords, etc. Protected data from protected memory stored in cache may be accessed by malicious code in a side-channel attack where malicious code takes advantage of knowing that certain cached data in the cache is from kernel addresses and may contain sensitive and confidential protected data.

There is a need in the art for improved techniques for detecting malicious code attempting to access protected data stored in cache to prevent malevolent activity and compromising data.

SUMMARY

In a first embodiment, potentially malicious code is detected accessing data from a storage, by executing trap code in response to processing a specified type of command in application code to allocate a trap address range used to detect potentially malicious code; executing the specified type of command in the application code; determining whether to modify a frequency of executing the trap code in response to processing the specified type of command; and modifying the frequency of executing the trap code in response to processing the specified type of command in response to determining to determining to modify the frequency of executing the trap code.

With the first embodiment, execution of a specified type of command, such as a command that could provide access to a protected address space or sensitive data, triggers execution of trap code that allocates a trap address range. If an application tries to access that trap address range, which would not be an address range accessed by the application code being executed, then an assumption can be made that the accessing application is malicious or has a bug that causes it to access a trap address range, not allocated for the application. Once such an access to a trap address range is detected, then protective actions may be taken with respect to the application code, such as blocking, monitoring, etc. In this way, the threat monitor program limits monitoring to not everything an application does, but provides more focused monitoring of situations where a malicious program would seek to take advantage of a specified type of command in the application code that may provide access to sensitive information. Further, the frequency of executing the trap code may be modified depending on a risk of there being malicious activity. For instance, if the risk of malicious activity is lower, then the frequency of executing the trap code may be reduced to conserve processing and computational resources. If there is a higher risk of malicious activity, then the frequency of executing the trap code may return to the higher level because at such point there is a greater need to monitor due to increased malicious activity.

In a second embodiment, the determining whether to modify the frequency of executing the trap code comprises determining that an application has not accessed a trap address range in a period of time, wherein a determination is made to modify the frequency of executing the trap code in response to determining that an application has not accessed the trap address range in the period of time.

With the second embodiment, the frequency for executing the trap code is modified, such as reduced, if the trap address range has not been accessed in a period of time, which indicates that there is a lower risk of malicious activity due to the absence of applications accessing the trap address range, signaling access by malicious code. In this way, the second embodiment provides improved computer technology for adjusting execution of the trap code to detect malicious to reduce monitoring activity if possible.

In a third embodiment, the modifying the frequency comprises stopping execution of the trap code in response to the processing of the specified type of command.

With the third embodiment, computational resources are conserved during a period of less risk of malicious activity, by stopping execution of the trap code.

In a fourth embodiment, the modifying the frequency comprises executing the trap code in response to processing a plurality of instances of the specified type of command.

With the fourth embodiment, computational resources are conserved by reducing the frequency at which the trap code is executed.

In a fifth embodiment, a frequency of executing the trap code prior to determining whether to modify the frequency of executing comprises a first frequency of executing the trap code, wherein the modifying the frequency of executing the trap code comprises changing the frequency of executing the trap code to a second frequency of executing trap code. A subsequent determination of whether to modify the frequency of executing the trap code is performed after changing the frequency of executing the trap code to the second frequency of executing the trap code. The frequency of executing the trap code is changed to the first frequency of executing the trap code in response to the subsequent determination to modify the frequency of executing the trap code.

With the fifth embodiment, the frequency is changed between a first and a second frequency upon determining whether to modify the frequency. For instance, when a risk of malicious activity has been determined to be relatively low, the frequency of executing the trap code may be changed from the first higher frequency to the second lower frequency of execution of the trap code to conserve computational resources. Further, a subsequent determination to modify the frequency of executing the trap code after changing the frequency to the second lower frequency is made in the event that a risk of malicious activity has increased, necessitating a return to more frequent threat monitoring by returning the frequency of executing the trap code to a higher level, that was present before the frequency was reduced because of a previously determined lower risk of malicious activity.

In a sixth embodiment, a processor executes application code and speculatively executes branches of conditional branches of the application code in advance of a location at which the application code is being executed, wherein a result of only one of the conditional branches is maintained depending on a condition used to determine which of the conditional branches to traverse. In response to detecting potentially malicious activity, the speculatively executing of the application code is disabled.

The sixth embodiment provides improvements to computer technology by disabling speculative execution upon detecting the malicious activity. In this way, if there is a period of increased risk of malicious code, as indicated by detection of a potentially malicious activity, then speculative execution is stopped because speculative execution may allocate kernel space addresses having sensitive information, providing more opportunities for such access to malicious code. Stopping the speculative execution during those periods of increased malicious activity reduces the opportunities for malicious code to access kernel address space allocated during the speculative execution, such as execution in conditional branches.

In a seventh embodiment, trap code is executed in response to processing a specified type of command in application code to allocate a trap address range used to detect potentially malicious code. The specified type of command in the application code is executed, and the detecting the potentially malicious activity comprises detecting that an application has accessed the trap address range.

With the seventh embodiment, trap code is executed to allocate a trap address range to detect potentially malicious code when a specified type of command is processed, such as a type of command, e.g., a system command, that may be exploited by malicious code to access the kernel address space. Described embodiments provide improvements to the computer technology for detecting malicious code by allocating trap address ranges to provide more opportunities to catch malicious code trying to access the trap address ranges.

In an eighth embodiment, an absence of potentially malicious activity is detected for a time period after disabling the speculatively executing the application code. The speculative execution may be restarted in response to detecting the absence of potentially malicious activity. During period of an absence of malicious activity, speculative execution may be restarted to improve computing efficiency because there is a lower risk of malicious activity as a result of not detecting malicious activity for a time period.

DETAILED DESCRIPTION

Figure 1:
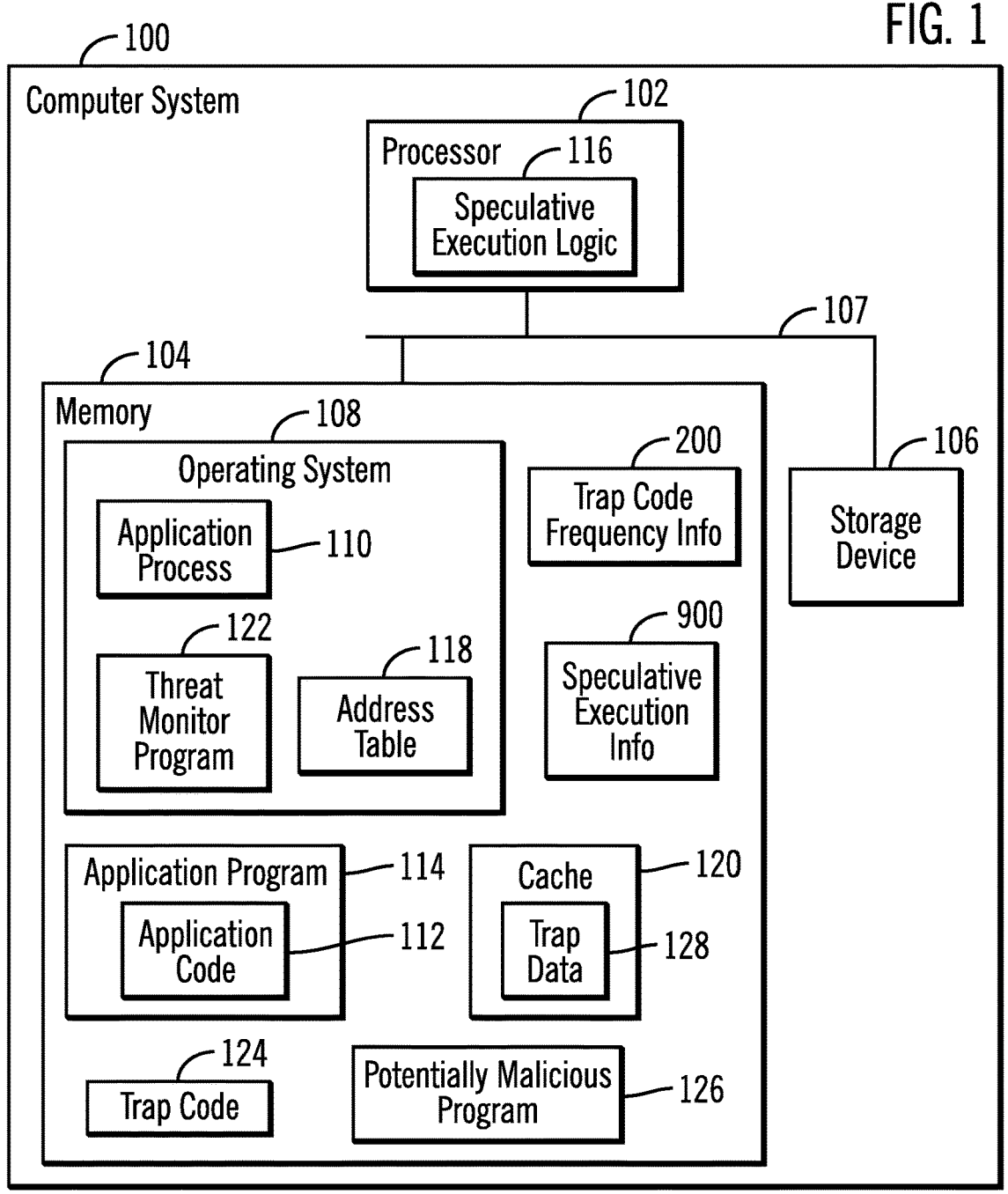
FIG. 1 illustrates an embodiment of a computing environment.

In speculative execution, a processor will speculatively execute application code ahead of the application process in the execution path to make parameters and data available to the application process when it eventually reaches the point in the program at which the speculative execution of the application code occurred. If the speculative execution reaches a conditional branch of different paths of execution depending on a condition, such as a value of a previously determined parameter, then the processor speculative execution will process the application code in all the conditional branches to pre-calculate parameters and values to be available regardless of which path of the conditional branches the application process will traverse. This substantially increases the speed of the application process by being able to use the speculatively generated parameters and information without having to execute the application code.

In the current art, when a process speculatively executing code processes a system call in a conditional branch to access data in kernel addresses, the accessed data, which may comprise sensitive and personal information, may be stored in cache. Further, the accessed data may remain in cache if the application process proceeds down the other branch not including the system call accessing protected data in the kernel. Malicious code may attempt to read cached protected data stored in the cache by the speculative execution.

To address the risks of speculative execution, in the current art, speculative execution may be halted on any conditional branch to avoid leaving protected data in the cache. Another current solution is to flush the cache to remove any protected data or unmap addresses to the protected data. However, these solutions, by eliminating parameters and other information speculatively generated in advance of the application process will eliminate the benefits of speculative execution that makes data and parameters available in advance of their need by the application process.

Described embodiments provide improvements to computer technology to detect malicious code while allowing processor speculative execution to proceed by executing trap code in response to processing a specified type of command. The trap code allocates a trap address range. The specified type of command may then be executed after executing the trap code. The trap address range would not be an address range used by the application because it was allocated by trap code, which is not part of the application code. When an application attempts to access the trap address range, the application may be considered potentially malicious code and a protective action may be taken, such as performing at least one of transmitting a notification that the accessing application comprises potentially malicious code, monitoring the execution of the accessing application, and restricting execution of the application accessing the trap address range.

Described embodiments provide further improvements to handling detection of malicious code by adjusting a frequency at which the trap code is executed to reduce execution if the risk of malicious code is low, as evidenced by not detecting malicious code within a time period. Further, the frequency at which trap code is executed may be increased or returned to normal execution after executing a specified command type, such as a system call, if malicious code is again detected.

Described embodiments provide additional embodiments for handling detection of malicious code by disabling speculative execution if malicious code is detected as accessing a trap address range allocated in response to executing the trap code when a specified command type is processed.

FIG. 1 illustrates an embodiment of a computing environment including a computer system 100 having a processor 102, a memory 104, and a storage device 106 that communicate over a bus 107. The processor 102 may comprise a separate central processing unit (CPU), one or a group of multiple cores on a single CPU, or a group of processing resources on one or more CPUs.

The memory 104 includes an operating system 108 to manage application access to data stored in the storage device 106, and manage the addressing of data as a track, Logical Block Address (LBA), storage cell, group of cells (e.g., column, row or array of cells), sector, segment, etc., which may be part of a larger grouping of tracks, such as a volume, logical device, etc. The operating system 108 may spawn one or more instances of an application process 110 to execute application code 112 in an application program 114, where there may be multiple applications 114. The processor 102 includes speculative execution logic 116 to speculatively execute application code 112 in advance of a position in the execution path at which the application process 110 is executing the application code 112, so that parameters and other information from the speculatively executed application code 112 are available to the application process 110 when it reaches that point in the application code 112 that was speculatively executed. The processor 102 may perform speculative execution on any running process 110.

The operating system 108 maintains an address table 118, also known as a hardware page table (HPT), providing a mapping of logical addresses allocated to applications 114 to a physical location of where the data is stored in a local cache 120 in the memory 104 or in the storage device 106. In certain embodiments, the logical addresses may comprise virtual addresses, where data for the virtual or logical addresses may be stored in the cache 120 in the memory 104 or in the storage device 106, where data for virtual addresses in the storage device 106 needs to be paged into the cache 120 for access by the application process 110 and speculative execution by the processor 102.

The operating system 108 may further include a threat monitor program 122 to determine whether an application 126, executing in the computer system 100 or a remotely connected computer system over a network, issuing Input/Output (I/O) requests comprises a potentially malicious program 126, such as malware, ransomware, virus, and other malicious code.

The memory 104 includes trap code 124 that is injected into the path of speculative execution of the application code 112. The trap code 124 is intended to allocate trap addresses or trap data 128 that would not be accessed by the application program 114, and would likely be accessed by a malicious program seeking to access data to steal, such as in a side-channel attack, or accessed as a result of a bug in a legitimate program. In one embodiment, the trap code 124 may allocate a trap address range of addresses that map to invalid locations, such that access to the trap address range would result in a segmentation fault and alert the operating system 108 to potential malicious activity. In an alternative embodiment, the trap address range may map to trap data 128 added by the trap code 124 to the cache 120, such as fake passwords and user identifiers, that would not be presented by legitimate application programs 114 or valid users. Thus, a potentially malicious application 126 or user that presents trap data 128 to access computational resources in the system 100 are engaged in suspicious activity as a potentially malicious program 126 for which protective action needs to be taken. It may be assumed that ransomware or other malevolent programs would access the trap data 128 as part of operations to steal or encrypt data in the storage 106. A trap address range may be identified and indicated in information and flags of the address table 118.

The memory 104 maintains trap code frequency information 200 and/or speculative execution information 900. The trap code frequency information 200 includes information and a timer to determine a frequency at which to execute the trap code. The speculative execution information 900 includes information and a timer to determine whether to disable speculative execution. The memory 104 may maintain the trap frequency information 200 and/or the speculative execution information 900.

The memory 104 further includes a threat monitor program 122 to detect suspicious processes that potentially have malicious code, such as a virus, ransomware, etc., based on access to a trap address range and/or trap data 128 created by the trap code 124.

The operating system 108, application program 114, trap code 124, and threat monitor program 122 are shown in FIG. 1 as program code loaded into the memory 104 and executed by one or more of the processors 102. Alternatively, some or all of the functions may be implemented as microcode or firmware in hardware devices in the system 100, such as in Application Specific Integrated Circuits (ASICs).

The storage 106 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 104 may comprise a suitable volatile or non-volatile memory devices, including those described above.

Figure 2:
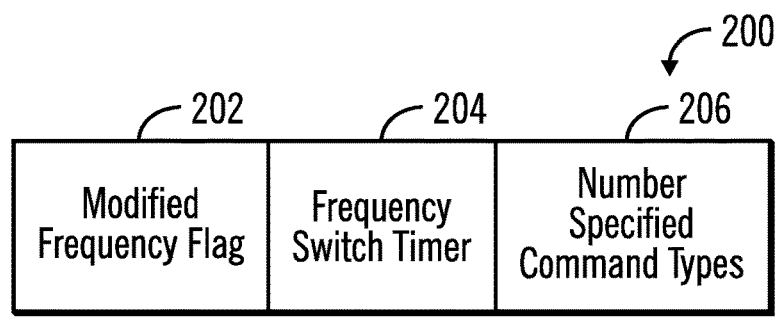
FIG. 2 illustrates an embodiment of trap code frequency information used to determine a frequency at which to inject trap code into an execution path.

FIG. 2 illustrates an embodiment of trap code frequency information 200, including a modified frequency flag 202 indicating whether the trap code 124 is executed at an initial or regular frequency (e.g., first frequency), such as in response to executing a specified command type, e.g., a system call, or whether the trap code is executed at a reduced or modified frequency (e.g., second frequency or lower frequency), such as not executed or executed after processing a predetermined number of specified command types; a frequency switch timer 204 used to determine whether to change to the modified frequency or initial/unmodified frequency; and a number of specified command types 206 used in the embodiment where the modified or lower frequency executes the trap code 124 every number of the specified command types 206 processed.

Figure 3:
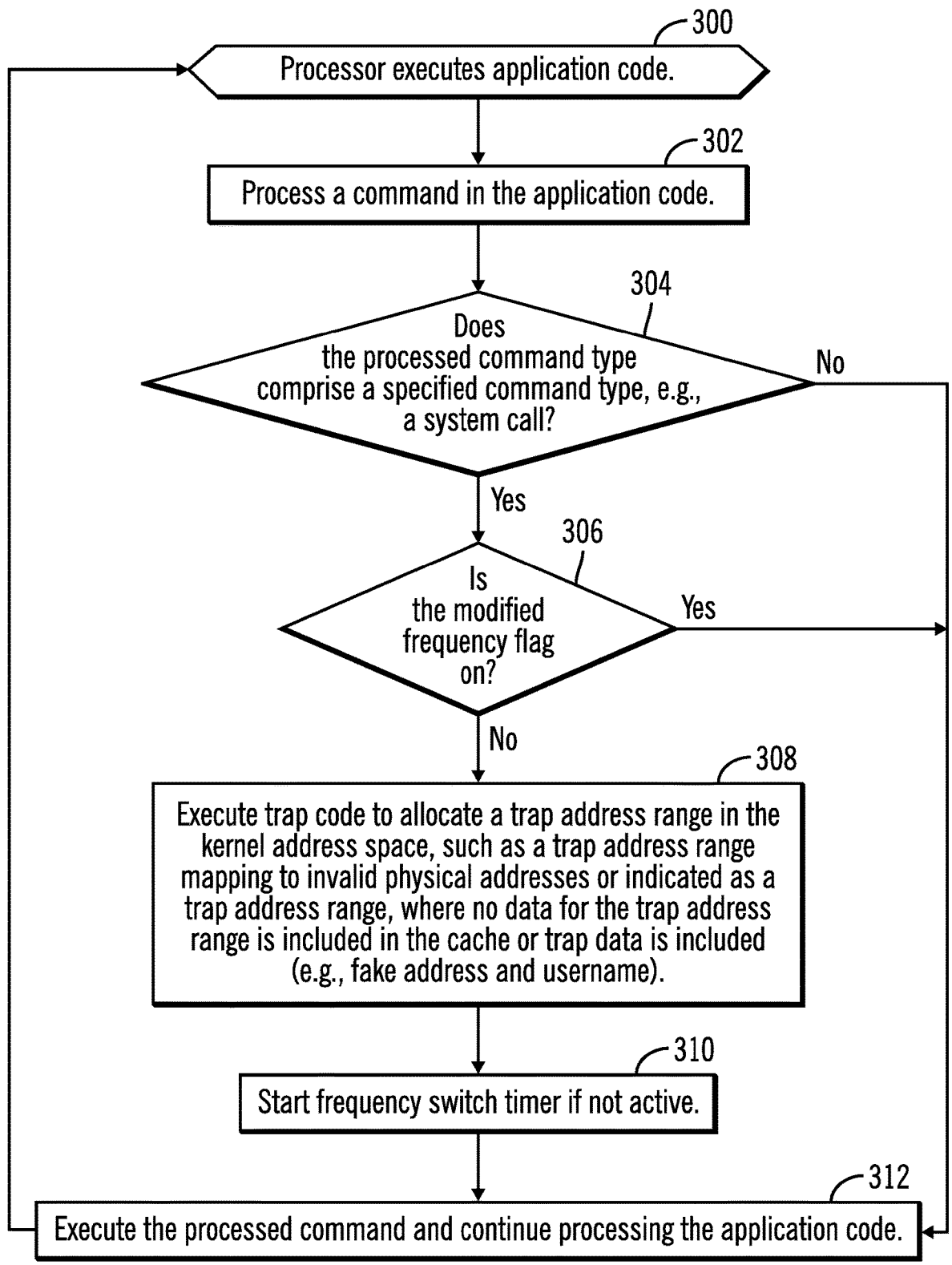
FIGS. 3 and 3A illustrate embodiments of operations to inject trap code into an execution path of a process executing application code to allocate a trap address range according to a determined frequency.

FIG. 3 illustrates an embodiment of operations for the processor 102 executing execution code, which may be part of normal application code processing or speculative execution of the application code 112. Upon initiating (at block 300) an operation to execute application code 112, speculatively or otherwise, the processor 102 processes (at block 302) a command in the application code 112. If (at block 304) the processed command type is a specified command type to trigger execution of trap code 124, such as a system call or call to access the kernel address space, the processor 102 determines (at block 306) whether the modified frequency flag 202 is on, i.e., indicating that the trap code 124 is executed at the modified or lower frequency. If (at block 306) the modified frequency flag 202 is off, indicating regular frequency processing, then the processor 102 executes (at block 308) the trap code 124 to allocate a trap address range in the kernel address space, such as a trap address range mapping to invalid physical addresses or a range for which no data is stored in the cache. Alternatively, the processor 102 may include trap data 128 in the trap address range, such as including a fake username and password. The frequency switch timer 204 is started (at block 310) if the timer is not currently active, i.e., has not been started.

If (at block 304) the process command is not of the specified type or if the modified frequency flag 202 is on, indicating the lower frequency, or after determining whether to start the frequency switch timer 204 (at block 310) after executing the trap code 124 (at block 308), the processor 102 executes (at block 312) the processed command and continues processing the application code 112, such as speculatively processing code in all conditional branches. There may be multiple instances of trap address ranges created in response to multiple instances of executing the trap code 124 during execution.

Figure 3A:
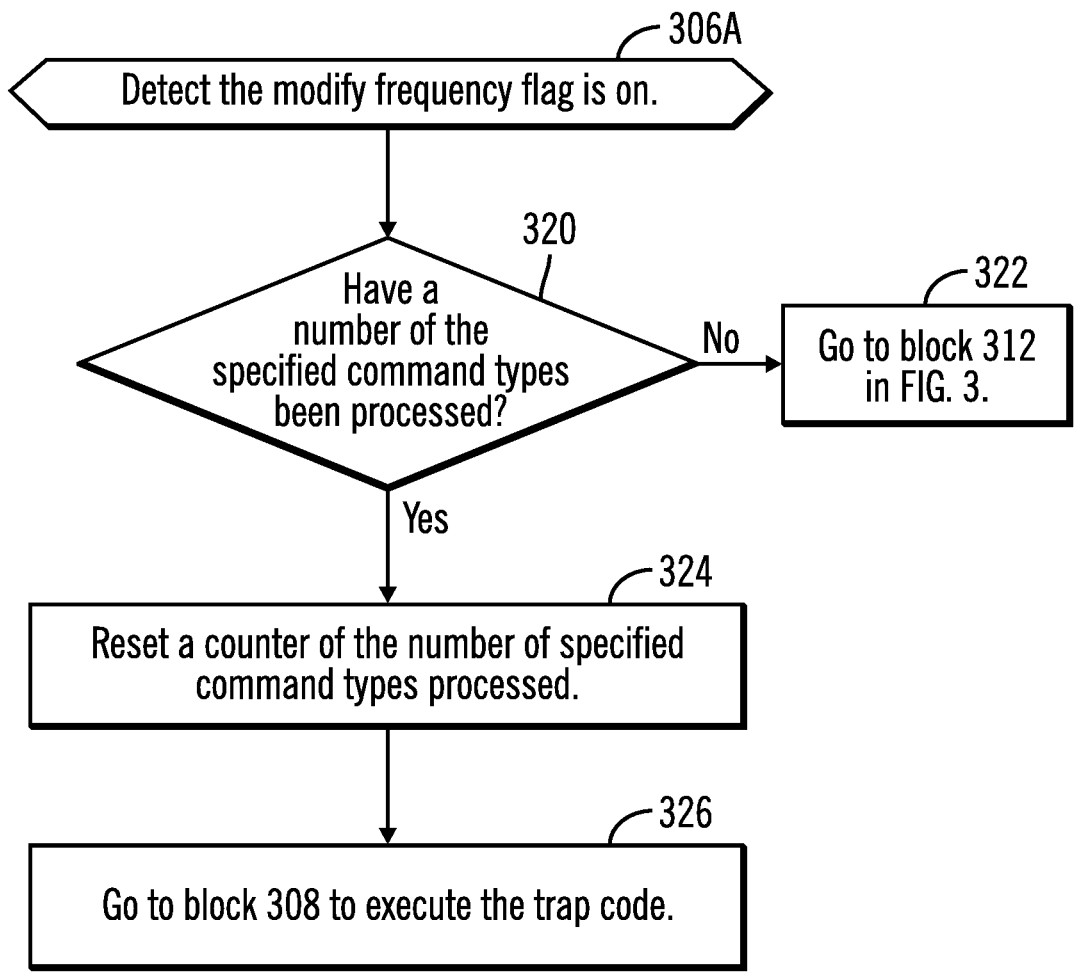

In one embodiment, if the modified frequency flag 202 is on (at block 306) and if the lower frequency comprises to stop executing the trap code 124, then control would proceed to block 312 without executing the trap code 124 as shown in FIG. 3. FIG. 3A illustrates an alternative embodiment where in the lower frequency mode, the trap code 124 is executed every number of specified command type 206. In such an embodiment, upon detecting (at block 306A) that the modified frequency flag 202 is on, the processor 102 determines (at block 320) whether the number of specified command types 206 has been executed, such as indicated in a counter. If (at block 320) the specified number 206 has not been processed, then control proceeds (at block 322) to block 312 in FIG. 3 to bypass executing the trap code 124. If (at block 320) the number of specified command type 206 has been processed while the modified frequency flag 202 is set, then the processor 102 resets (at block 324) a counter keeping track of whether the number of specified command types 206 and proceeds to block 308 in FIG. 326 to execute the trap code 124.

In the embodiment of FIGS. 3 and 3A, the modified/lower frequency for executing the trap code 124 is used to stop executing the trap code 124 or reduce the frequency of executing the trap code 124 when the specified (system) command type is processed to reduce trap code 124 processing burdens when potentially malicious code has not been detected for a time period, comprising the frequency switch timer 204. The lack of detecting malicious code accessing the trap address range indicates that the trap code 124 execution is less likely to be needed due to the likely continued absence of malicious code.

Figure 4:
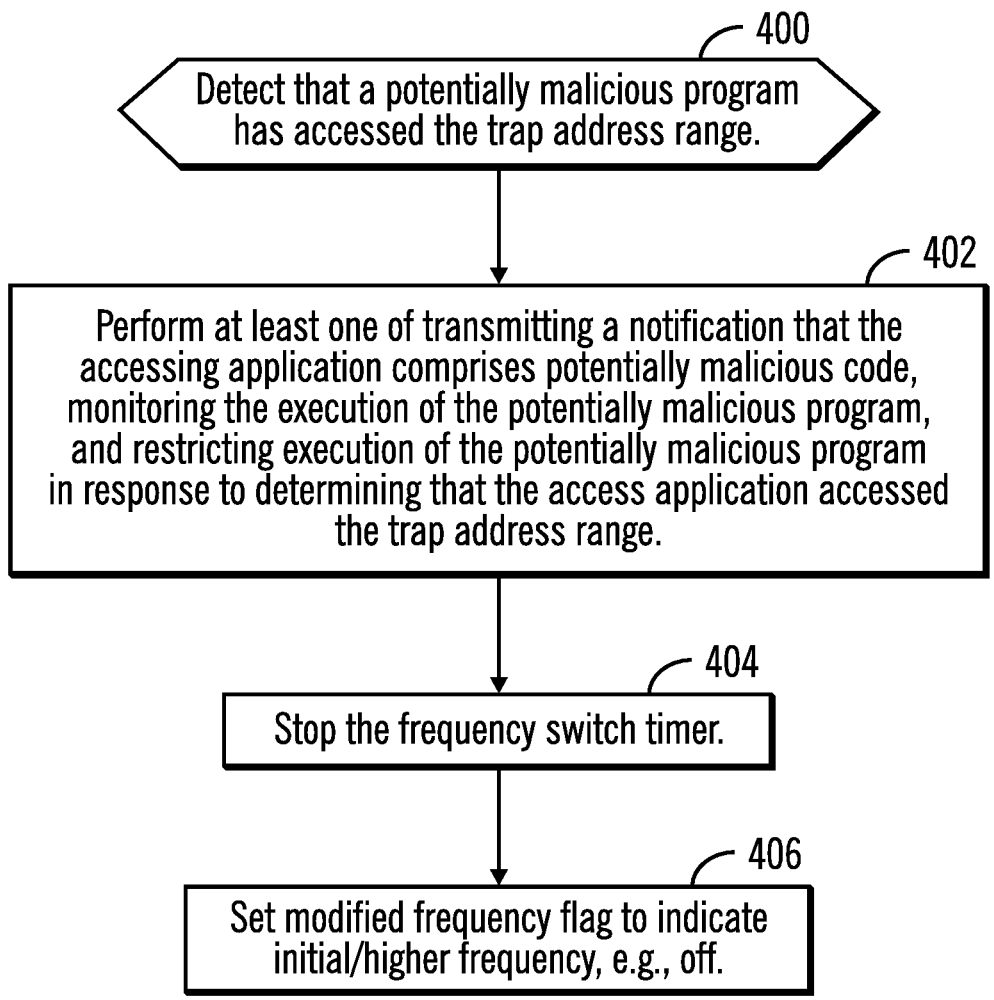
FIG. 4 illustrates an embodiment of operations to detect potentially malicious activity from accesses to the trap address range and modify the frequency at which trap code is executed.

FIG. 4 illustrates an embodiment of operations performed by the threat monitor program 122, which may be part of the operating system 108, to determine whether an application program 126 is a potentially malicious program. Upon detecting (at block 400) that a potentially malicious program 126 has accessed the trap address range, such as issued a read or write to the trap address range, the threat monitor program 122 performs (at block 402) at least one of transmitting a notification to a user or an anti-virus program that the accessing application 126 comprises potentially malicious code, monitoring the execution of the potentially malicious program 126, and restricting execution of the potentially malicious program 126. For instance, the threat monitor program 122 may quarantine the potentially malicious program 126 and alert the user to take further action, such as allow the potentially malicious program 126 to run if it is an authorized program, delete or otherwise block from executing the potentially malicious program 126. In certain embodiments, the monitoring of the potentially malicious program 126 may comprise allowing the program 126 to run in a "honey pot" environment where information is provided to the program 126 in order to monitor how the potentially malicious program 126 interacts in the computer system 100 and which addresses it communicates with over the Internet.

The threat monitor program 122 or other process detecting access to the trap address range, may further stop (at block 404) the frequency switch timer 204, which runs to determine whether to lower the frequency at which trap code 124 is executed due to lack of malicious activity detection, and sets (at block 406) the modified frequency flag 202 to indicate the initial/higher/unmodified frequency of processing the trap code 124, i.e., after processing the specified type of command.

With the embodiment of FIG. 4, once malicious activity has been detected, the processor 102 is to go back to regularly executing the trap code 124 when processing the specified type of command, e.g., system call, when the frequency of executing the trap code 124 was previously made lower, because further malicious activity is more likely due to the detection of malicious activity. In such case, the processor 102 should continue to execute the trap code 124 whenever the system call is executed to maximize the opportunity to detect malicious code during this period of heightened risk of malicious code that is present right after detection of potential malicious activity. In this way, if the trap code 124 was being executed at the reduced frequency due to previously determined lower risk of malicious activity, then this lower risk processing would be reversed by setting the modified frequency flag 202 back to the initial/regular/higher frequency processing of the trap code 124 due to the increased risk indicated by the detection of a potentially malicious program access the trap address range.

Figure 5:
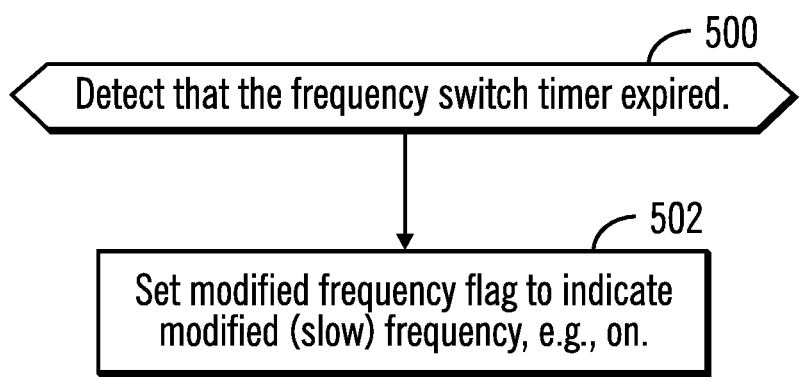
FIG. 5 illustrates an embodiment of operations to reduce a frequency at which trap code is executed in response to a frequency switch timer.

FIG. 5 illustrates an embodiment of operations performed by the processor 102, executing code, or the threat monitor program 122, upon detecting the frequency switch timer 204 has expired, which means that a time period defined by the frequency switch timer 204 has passed without experiencing an access to the trap address range, or potentially malicious activity. Upon the frequency switch timer 204 expiring (at block 500), the processor 102 sets (at block 502) the modified frequency flag 204 to indicate the modified or slow frequency, e.g., on, because less frequent processing of the trap code 124 is warranted given that malicious activity has not been detected within the time period defined by the frequency switch timer 204. If malicious activity was detected while the frequency switch timer 204 was running or active, then the processor 102 or threat monitor program 122 would stop (at block 404) the timer 204 and set the modified frequency flag (at block 406) to indicate the initial/higher frequency for executing the trap code 124.

Figure 6:
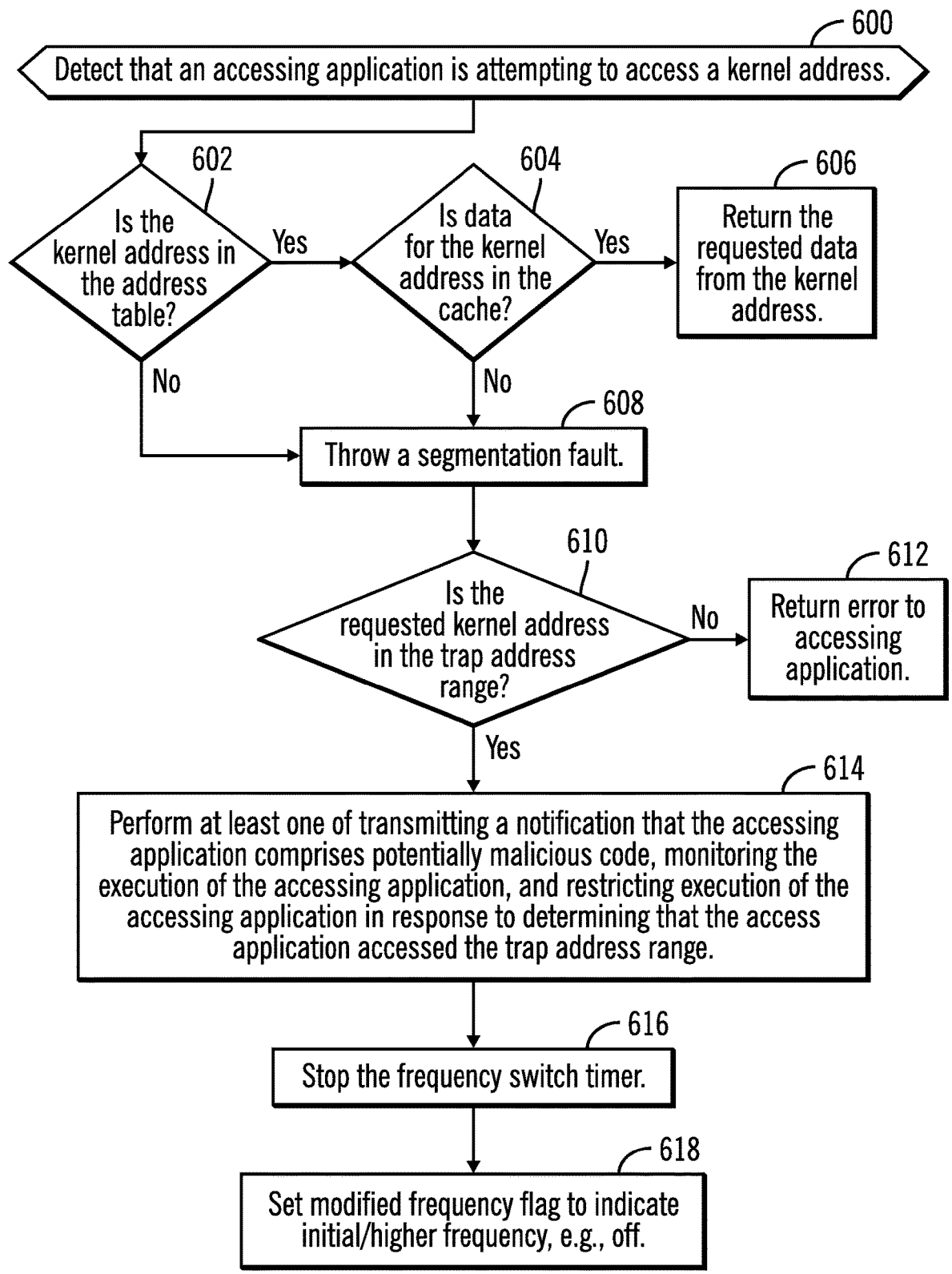
FIG. 6 illustrates an embodiment of operations to detect access to a trap address range when a potentially malicious program is attempting to access a kernel address.

FIG. 6 illustrates an additional embodiment of operations performed by the operating system 108, threat monitor program 122, and/or other program to determine whether an application program 126 is a potentially malicious program when the application attempts to access a kernel address in the kernel address space of the operating system 108. Upon detecting (at block 600) that an application 126, which may be executing in the user space, is attempting to access a requested kernel address, the operating system 108/threat monitor program 122 determines (at block 602) whether the requested kernel address is in the address table 118. If (at block 602) the kernel address is in the address table 118 and if (at block 604) data for the requested kernel address is in the cache 120, then the requested data for the kernel address is returned (at block 606) from the cache 120 to the requesting application. If (at block 602) the requested kernel address is not in the address table 118 or if (at block 604) data for the requested kernel address is not in the cache 120, then a segmentation fault is thrown (at block 608).

In response to the segmentation fault (at block 608), the operating system 108/threat monitor program 122 determines (at block 610) whether the requested kernel address is in the trap address range. If not, then an error is returned to the accessing application (at block 612), which may not be a malicious program 126 because it was not trying to access a trap address, but may comprise a legitimate program receiving a segmentation fault. If (at block 610) the requested kernel address is in the trap address range, then the program 126 may be considered malicious and threat monitor program 122 performs one of the threat handling operations (at block 614) described with respect to the potentially malicious program 126, stops (at block 616) the frequency switch timer 204, and sets (at block 618) the modified frequency flag 202 to "off", such as described with respect to blocks 402, 404, and 406 in FIG. 4.

Figure 7:
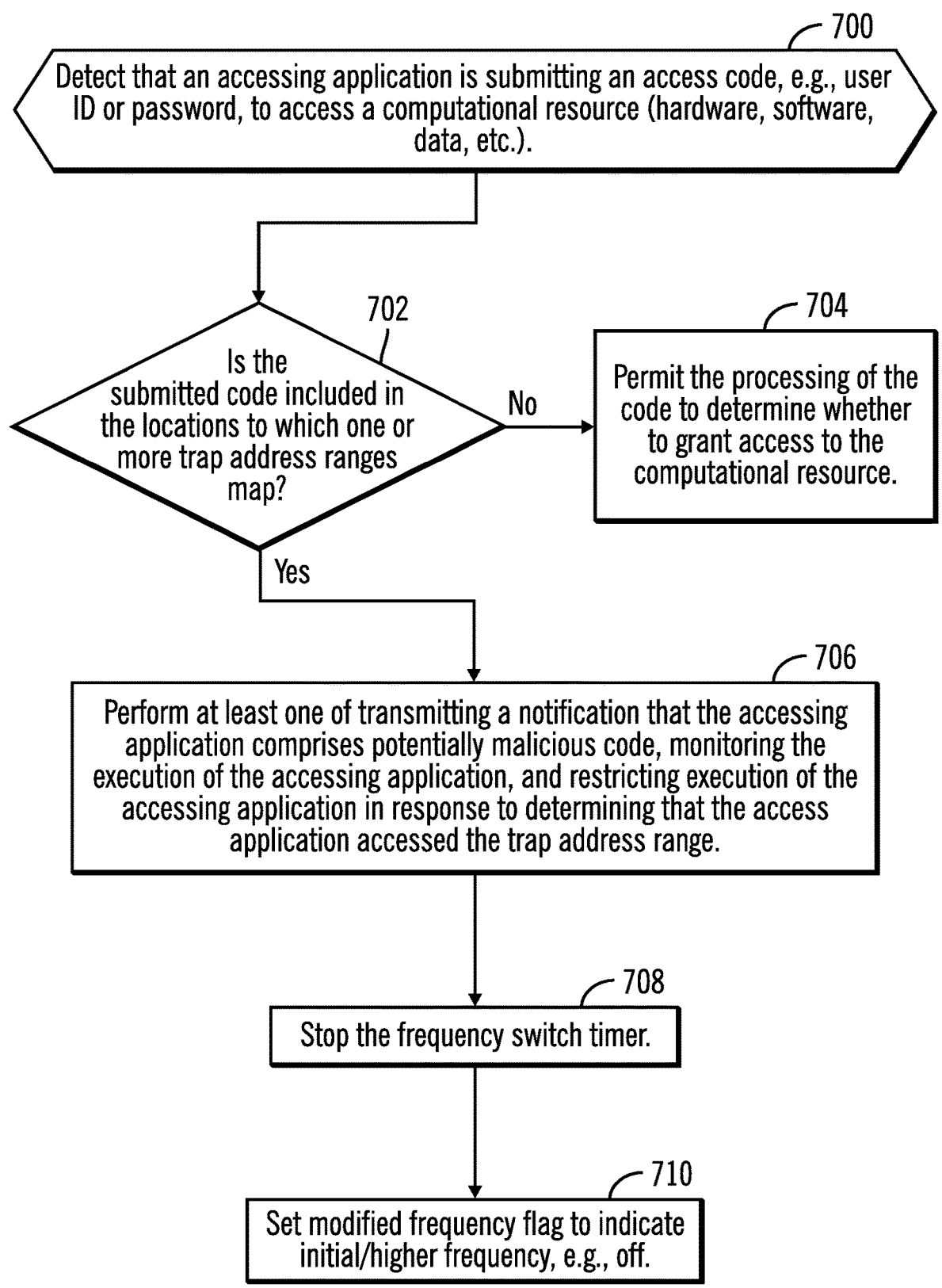
FIG. 7 illustrates an embodiment of operations to detect that a potentially malicious program is submitting a trap code from a trap address range to access computational resources.

FIG. 7 illustrates an additional embodiment of operations performed by the threat monitor program 122, operating system 108 and/or other program to determine whether an application program 126 is a potentially malicious program in an embodiment where trap data 128 are provided at the trap address range, such as having trap passwords and user IDs. Upon detecting (at block 700) that an accessing application 126 is submitting an access code, such as a user ID or password, to access a computational resource, such as a hardware, software or a data resource in or coupled to the computer system 100, the threat monitor program 122/operating system 108 determines (at block 702) whether the submitted code(s) are at locations in the cache 120 or storage 106 addressed by one of the addresses in a trap address range. If (at block 702) the submitted access code is not from a trap address range, then the threat monitor program 122 permits (at block 704) the processing of the code to determine whether access to the requested computational resource is authorized. Otherwise, if (at block 702) the submitted access code is in one of the trap address ranges, then then the threat monitor program 122 performs one of the threat handling operations (at block 706) described with respect to the potentially malicious program 126, stops (at block 708) the frequency switch timer 204, and sets (at block 710) the modified frequency flag 202 to off, such as described with respect to blocks 402, 404, and 406 in FIG. 4.

With the embodiments of FIGS. 6 and 7, if an application is detected trying to access one of the trap address ranges or submitting codes stored in the trap address ranges, then there is a high likelihood that the accessing application comprises malicious code because the trap address ranges were not allocated by application code 112 from a legitimate application program 114, unless the legitimate application program 114 has an error or bug where it is accessing addresses not allocated to the application program 114. For this reason, the frequency switch timer 204 is stopped and the modified frequency flag 202 is set to indicate to execute trap code at the higher frequency rate when each system command is processed given the heightened risk of malicious activity resulting from the detection of a process behaving in a potentially malicious manner, accessing the trap address range or submitting an access code in a trap address range.

Figure 8:
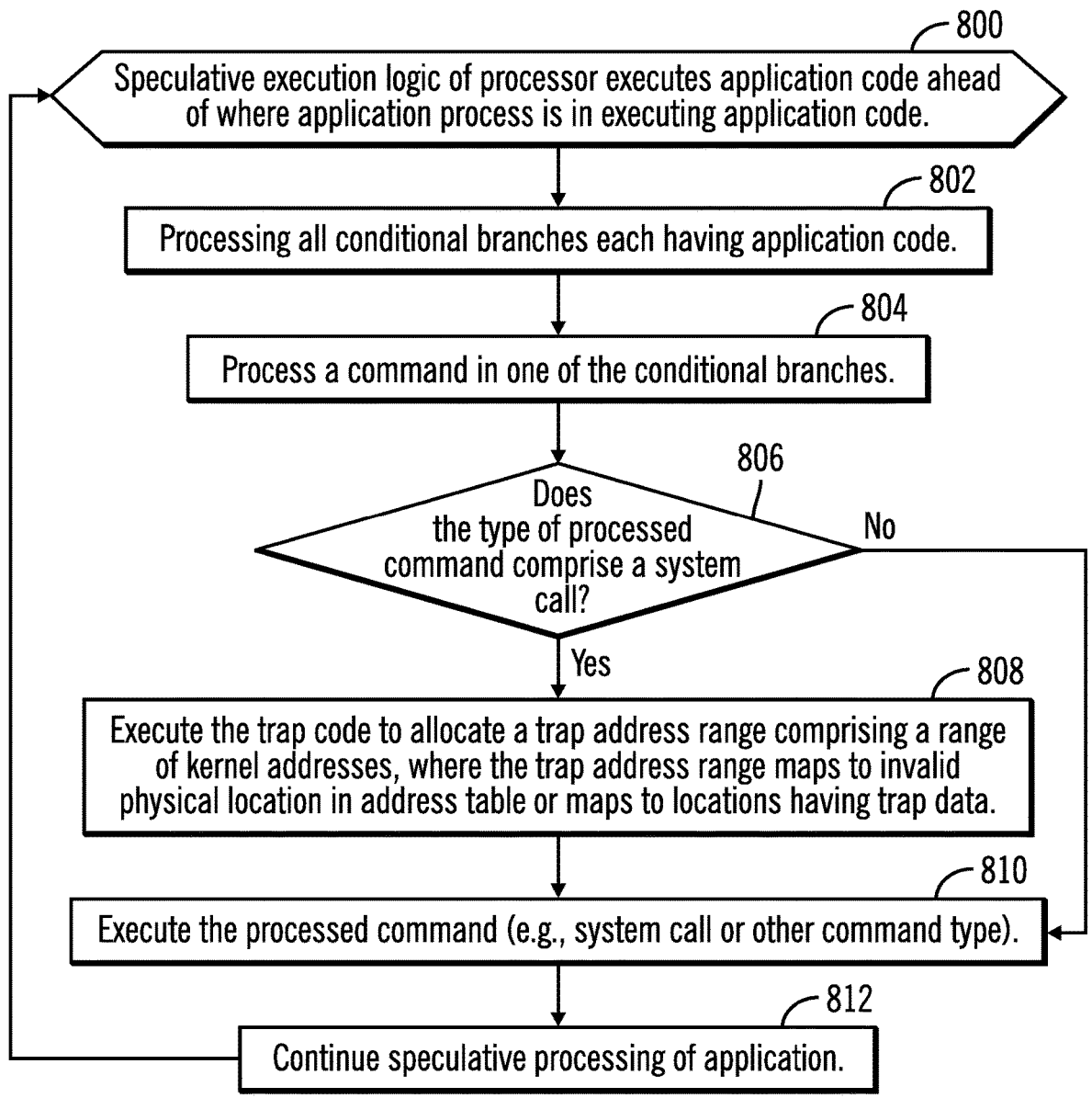
FIG. 8 illustrates an embodiment of operations by a speculative execution process to inject trap code while performing speculative execution of the application code to allocate the trap address range to detect malicious code.

FIG. 8 illustrates an embodiment of operations performed by the processor 102 performing speculative execution ahead of where the application process 110 is executing the application code 112 in the execution path. While speculatively processing (at block 800) the application code 112, the processor 102 processes (at block 802) conditional branches in the application code 112, where a condition or parameter value set during previously executed application code 112 determines which branch in the code to take.

The processor 102 processes the application code 112 in all branches to make any parameters and data available regardless of the branch the application process 110 processes when reaching that conditional branch. Upon processing (at block 804) a command in one of the conditional branches, the processor 102 determines (at block 806) whether the type of processed command comprises a system call or other access to the kernel mode and kernel address space. If so, the processor 102 executes (at block 808) the trap code 124 to allocate a trap address range, comprising a range of kernel addresses, which map to invalid location in the address table 118 or maps to locations having trap data 128. After processing the trap code 124 (from block 808) or if the processed command does not comprise a system call (from the no branch of block 806), the processor 102 speculatively executes (at block 810) the processed command and continues (at block 812) speculative execution of the application code 112 by proceeding back to block 800.

With the embodiment of FIG. 8, a system call triggers allocation of a trap address range during speculative execution of the application code 112. If the application process 110 takes the other branch not having the system call, which is likely to be a far more frequently traversed branch, then the code in that branch will have been speculatively executed, thus providing the benefits of speculative execution for the more frequently traversed branch. In this way, described embodiments, allow the benefits of speculative execution to be realized for the most frequent processing paths, while allocating trap address ranges in branches having system calls to be able to trap a malicious program 126 seeking to access kernel addresses. The malicious code 126 will see that the trap addresses were allocated in the conditional branch and attempt to access those trap addresses believing they were allocated as part of a system call, and may contain sensitive information, such as personal data, passwords, etc.

In alternative embodiments, the trap code 124 may be executed after the system call is executed.

Figure 9:
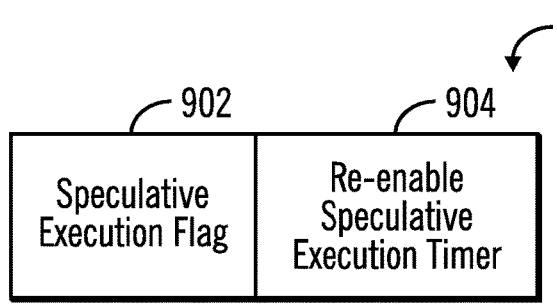
FIG. 9 illustrates an embodiment of speculative execution information used to determine whether to disable or re-enable speculative execution.

FIG. 9 illustrates an embodiment of the speculative execution information 900, including a speculative execution flag 902 indicating whether the speculative execution process defined in FIG. 8 is enabled or disabled and a re-enable speculative execution timer 904 used to determine when to restart or re-enable speculative execution if malicious activity has not been detected within a time period defined by the timer 904.

Figure 10:
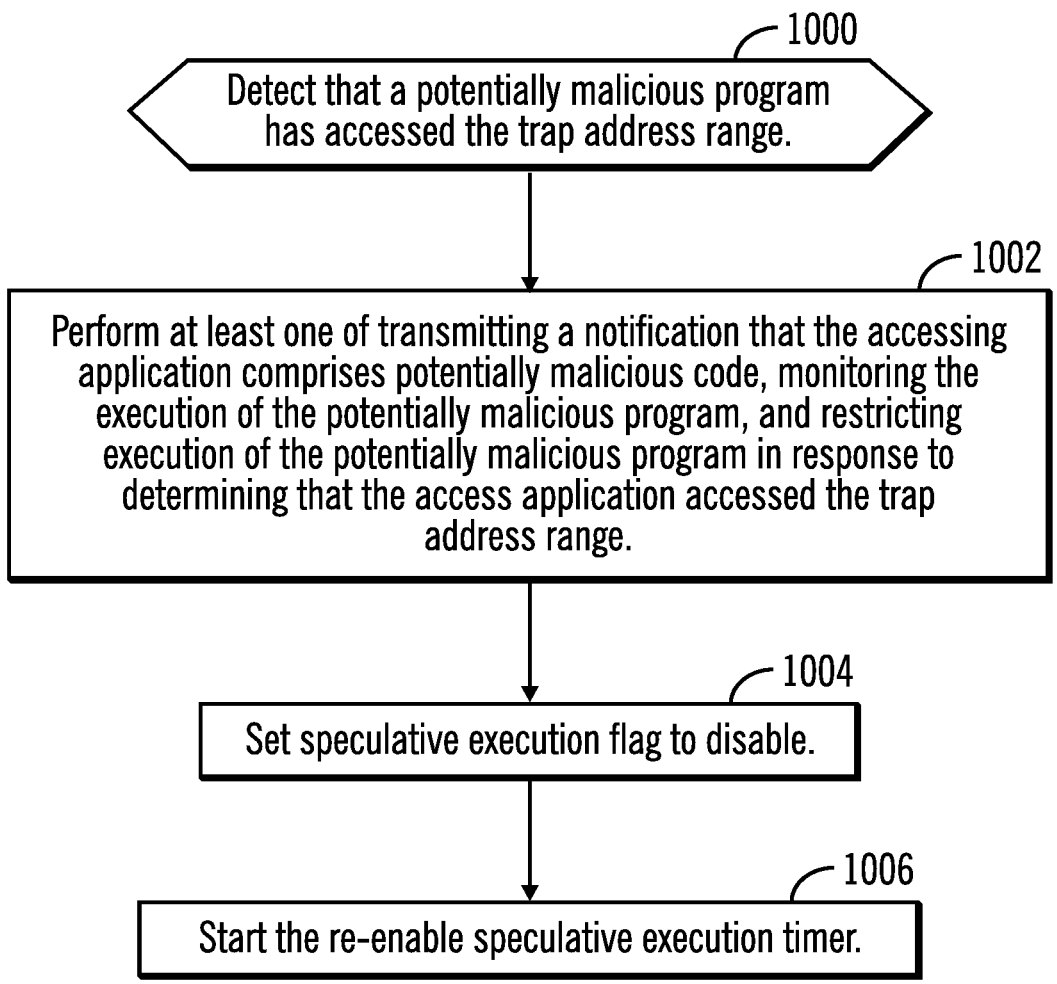
FIG. 10 illustrates an embodiment of operations to disable speculative execution of application code.

FIG. 10 illustrates an embodiment of operations performed by the threat monitor program 122, which may be part of the operating system 108, to determine whether an application program 126 is a potentially malicious program. Upon detecting (at block 1000) that a potentially malicious program 126 has accessed the trap address range, such as issued a read or write to the trap address range, the threat monitor program 122 performs (at block 1002) at least one of transmitting a notification to a user or an anti-virus program that the accessing application 126 comprises potentially malicious code, monitoring the execution of the potentially malicious program 126, and restricting execution of the potentially malicious program 126. For instance, the threat monitor program 122 may quarantine the potentially malicious program 126 and alert the user to take further action, such as allow the potentially malicious program 126 to run if it is an authorized program, delete or otherwise block from executing the potentially malicious program 126. In certain embodiments, the monitoring of the potentially malicious program 126 may comprise allowing the program 126 to run in a "honey pot" environment where information is provided to the program 126 in order to monitor how the potentially malicious program 126 interacts in the computer system 100 and which addresses it communicates with over the Internet.

The threat monitor program 122 or other process detecting access to the trap address range, may further set (at block 1004) the speculative execution flag 902 to disable to stop performing speculative execution at block 800 due to the detected potential malicious activity. Because speculative execution may allocate kernel address ranges in response to system calls, disabling speculative execution reduces opportunities for malicious code to access the kernel address space. The re-enable speculative execution timer 904 is started (at block 1006) to determine when to re-enable speculative execution at FIG. 8 if there is lower risk of malicious activity, which is less likely due to the lack of any malicious activity during the running of the re-enable speculative execution timer 904.

Figure 11:
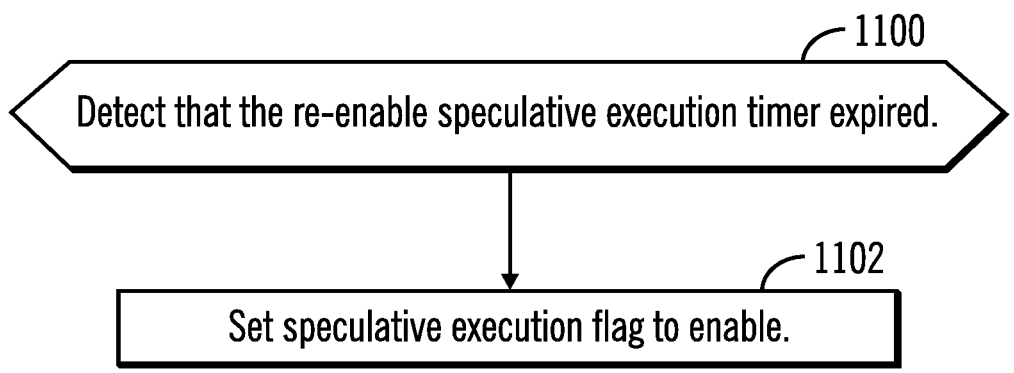
FIG. 11 illustrates an embodiment of operations to re-enable speculative execution of application code.

FIG. 11 illustrates an embodiment of operations performed by the processor 102, executing code, or the threat monitor program 122, upon detecting the re-enable speculative execution timer 904 has expired, which means that a time period defined by the re-enable speculative execution timer 904 has passed without experiencing an access to the trap address range, or potentially malicious activity. Upon the re-enable speculative execution timer 904 expiring (at block 1100), the processor 102 sets (at block 1102) the speculative execution flag 902 to indicate that speculative execution is enabled, which is warranted because malicious activity has not been detected within the time period defined by the re-enable speculative execution timer 904. If malicious activity was detected while the re-enable speculative execution timer 904 was running or active, then the processor 102 or threat monitor program 122 would disable speculative execution (at block 1004) and start (or restart) the re-enable speculative execution timer 904 (at block 1004).

In one embodiment, the computer system 100 may maintain one of the trap code frequency information 200 to perform the operations in FIGS. 3-7 to adjust a frequency of injecting the trap code or the speculative execution information 900 to perform the operations in FIGS. 10 and 11 to disable or enable speculative execution when malicious code is detected. In a further embodiment, the computer system 100 may maintain both information 200, 900 to both adjust the frequency at which trap code 124 is injected and disable/re-enable speculative execution when detecting malicious activity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
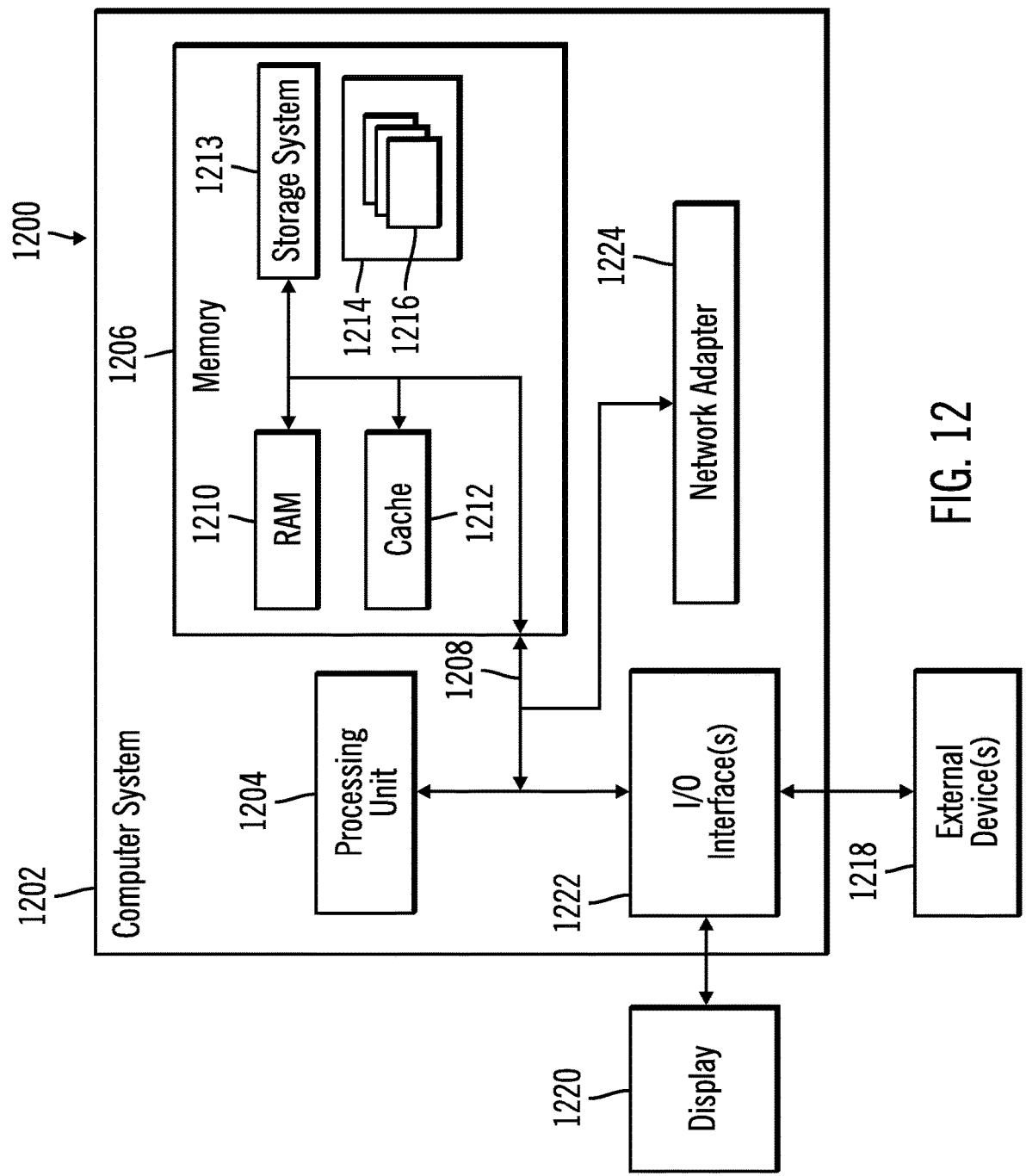
FIG. 12 illustrates a computing environment in which the components of FIG. 1 may be implemented

The computational components of FIG. 1, including the computer system 100, may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting malicious code accessing data from a storage, the computer program product comprising a computer readable storage medium having computer readable program code embodied therein that when executed performs operations, the operations comprising:
   providing a frequency flag indicating a first value or a second value;
   setting the frequency flag to the first value;
   executing trap code to allocate a trap address range in an address space that maps to a location in a memory in response to processing a specified type of command in application code only when the frequency flag has the first value;
   setting the frequency flag to the second value in response to determining that an application has not accessed the trap address range within a time period determined by a frequency timer; and
   providing speculative execution information and a timer to determine whether to disable or enable speculative execution of the application code.

2. The computer program product of claim 1, wherein the trap address range is not accessed by the application code being executed, and wherein the specified type of command comprises a command to switch from a user mode to kernel mode to access kernel addresses, and wherein the trap address range is defined in a kernel address space.

3. The computer program product of claim 1, wherein the operations further comprise:

starting the frequency timer in response to executing the trap code, wherein the determining that the application has not accessed the trap address range in the time period is made in response to the frequency timer expiring.

4. The computer program product of claim 3, wherein the operations further comprise:
determining whether the frequency timer is active in response to executing the trap code, wherein the frequency timer is active if the frequency timer has started and not expired, and wherein the frequency timer is started in response to determining that the frequency timer is not active.

5. The computer program product of claim 1, wherein the operations further comprises:
executing the trap code in response to processing the specified type of command a number of times.

6. The computer program product of claim 5, wherein the operations further comprise:
determining whether the specified type of command has been processed the number of times in response to detecting that the frequency flag has the second value.

7. The computer program product of claim 1, wherein the specified type of command is to access a kernel address space.

8. The computer program product of claim 1, wherein the trap code is executed in response to processing the specified type of command when the frequency flag has the first value.

9. The computer program product of claim 1, wherein the operations further comprise:
detecting that a program has accessed the trap address range; and
setting the frequency flag to the first value in response to detecting that the program has accessed the trap address range.

10. The computer program product of claim 9, wherein the operations further comprise:
starting the frequency timer in response to executing the trap code, wherein the determining that the application has not accessed the trap address range in the time period is made in response to the frequency timer expiring; and
stopping the frequency timer in response to detecting that the program has accessed the trap address range.

11. A system for detecting malicious code accessing data from a storage, comprising:
processor; and
a computer readable storage medium having computer readable program that when executed by the processor performs operations, the operations comprising:
providing a frequency flag indicating a first value or a second value;
setting the frequency flag to the first value;
executing trap code to allocate a trap address range in an address space that maps to a location in a memory in response to processing a specified type of command in application code only when the frequency flag has the first value;
setting the frequency flag to the second value in response to determining that an application has not accessed the trap address range within a time period determined by a frequency timer; and
providing speculative execution information and a timer to determine whether to disable or enable speculative execution of the application code.

12. The system of claim 11, wherein the operations further comprise:
executing the trap code in response to processing the specified type of command a number of times.

13. The system of claim 12, wherein the operations further comprise:
determining whether the specified type of command has been processed the number of times in response to detecting that the frequency flag has the second value.

14. The system of claim 11, wherein the specified type of command is to access a kernel address space.

15. The system of claim 11, wherein the operations further comprise:
starting the frequency timer in response to executing the trap code, wherein the determining that the application has not accessed the trap address range in the time period is made in response to the frequency timer expiring.

16. The system of claim 11, wherein the trap code is executed in response to processing the specified type of command when the frequency flag has the first value.

17. The system of claim 11, wherein the operations further comprise:
detecting that a program has accessed the trap address range; and
setting the frequency flag to the first value in response to detecting that the program has accessed the trap address range.

18. The system of claim 17, wherein the operations further comprise:
starting the frequency timer in response to executing the trap code, wherein the determining that the application has not accessed the trap address range in the time period is made in response to the frequency timer expiring; and
stopping the frequency timer in response to detecting that the program has accessed the trap address range.

19. A method for detecting malicious code accessing data from a storage, comprising:
providing a frequency flag indicating a first value or a second value;
setting the frequency flag to the first value;
executing trap code to allocate a trap address range in an address space that maps to a location in a memory in response to processing a specified type of command in application code only when the frequency flag has the first value;
setting the frequency flag to the second value in response to determining that an application has not accessed the trap address range within a time period determined by a frequency timer; and
providing speculative execution information and a timer to determine whether to disable or enable speculative execution of the application code.

20. The method of claim 19, further comprising:
executing the trap code in response to processing the specified type of command a number of times.

21. The method of claim 20, further comprising:
determining whether the specified type of command has been processed the number of times in response to detecting that the frequency flag has the second value.

22. The method of claim 19, wherein the specified type of command is to access a kernel address space.

23. The method of claim 19, further comprising:
starting the frequency timer in response to executing the trap code, wherein the determining that the application has not accessed the trap address range in the time period is made in response to the frequency timer expiring.

24. The method of claim 19, further comprising:
detecting that a program has accessed the trap address range; and
setting the frequency flag to the first value in response to detecting that the program has accessed the trap address range.

25. The method of claim 24, further comprising:
starting the frequency timer in response to executing the trap code, wherein the determining that the application has not accessed the trap address range in the time period is made in response to the frequency timer expiring; and
stopping the frequency timer in response to detecting that the program has accessed the trap address range.

\* \* \* \* \*